United States Patent
Olsen et al.

(10) Patent No.: US 6,679,454 B2
(45) Date of Patent: Jan. 20, 2004

(54) RADIAL SONOBUOY LAUNCHER

(75) Inventors: Mark L. Olsen, North Bend, WA (US); Jon W. Pitzer, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/123,823

(22) Filed: Apr. 15, 2002

(65) Prior Publication Data

US 2003/0192992 A1 Oct. 16, 2003

(51) Int. Cl.[7] ................................................. B64D 1/02
(52) U.S. Cl. ...................... 244/137.1; 89/1.54; 89/1.59; 89/1.8
(58) Field of Search ............................ 244/137.1, 137.4, 244/118.1; 89/33.02, 1.51, 1.52, 1.54, 1.55, 1.58, 1.59, 45, 1.801, 1.8, 1.802, 1.805, 1.815, 1.816, 1.819, 36.08

(56) References Cited

U.S. PATENT DOCUMENTS

| | | | | |
|---|---|---|---|---|
| 2,362,345 A | * | 11/1944 | Bertran | 244/137.1 |
| 2,913,198 A | * | 11/1959 | Bonbrake | 244/137.1 |
| 3,216,322 A | * | 11/1965 | Wenger et al. | 244/137.1 |
| 3,613,498 A | * | 10/1971 | Riccius | 89/1.51 |
| 3,969,977 A | * | 7/1976 | Opdahl et al. | 89/1.81 |
| 4,164,887 A | | 8/1979 | Ouellette | |
| 4,204,456 A | * | 5/1980 | Ward | 89/1.57 |
| 4,208,949 A | * | 6/1980 | Boilsen | 89/1.801 |
| 4,344,350 A | * | 8/1982 | Golden | 89/33.02 |
| 4,475,436 A | * | 10/1984 | Campbell | 89/1.804 |
| 4,637,292 A | * | 1/1987 | Peterson | 89/1.804 |
| 4,681,013 A | * | 7/1987 | Farley et al. | 89/1.815 |
| 4,720,065 A | | 1/1988 | Hamatani | |
| 4,962,798 A | | 10/1990 | Ferraro et al. | |
| 4,974,796 A | | 12/1990 | Carr et al. | |
| 5,092,221 A | | 3/1992 | Travor et al. | |
| 5,155,288 A | | 10/1992 | Marshall et al. | |
| 5,160,101 A | | 11/1992 | Ferraro et al. | |
| 5,857,647 A | | 1/1999 | Jakubowski | |

* cited by examiner

Primary Examiner—Galen L. Barefoot
(74) Attorney, Agent, or Firm—Shimokaji | Fritz LLP (57) ABSTRACT

A radial sonobuoy launch system comprising a clam-shell launch tube and method for launching a sonobuoy. The clam-shell launch tube radially releases a sonobuoy and the clam-shell launch tube is reloaded during flight. The sonobuoys are pneumatically ejected about parallel to the airstream. A pressure boundary structure, having a door and a gate, maintains cabin pressure during reloading and launching. Support arms and drive arms evenly distribute the ejection accelerations from the firing mechanism and guide the trajectory of the sonobuoy during release. A clam-shell launch tube is capable of launching a multitude of differently sized sonobuoys.

29 Claims, 10 Drawing Sheets

RADIAL SONOBUOY LAUNCHER

BACKGROUND OF THE INVENTION

The present invention generally relates to systems and methods for launching stores. More specifically, this invention relates to systems and methods for launching sonobuoys from aircraft.

Sonobuoys have been deployed into the ocean to aid in the detection of submarines and other vessels. Some sonobuoys are equipped with devices that emit signals and receive the resulting echo. Others are capable of detecting noise generated by crafts, such as submarines. By deploying a number of sonobuoys, the location of these crafts may be determined.

Deployment of sonobuoys is generally accomplished by launching the buoys from aircraft and Helicopters. Buoys have been ejected from aircraft using explosive cartridges or pneumatic systems to propel the buoys away from the aircraft during launch and gravity drop systems relying on gravity to propel sonobuoys away from the aircraft. Stores, such as buoys, have been launched approximately 45 degrees aft with respect to the air stream using these cartridges. Weapons, such as bombs and missiles, have also been deployed parallel to the airstream by gravity drop, Cartridge Activated Devices, and pneumatic systems using Bomb release units (BRU). Stores have also been deployed perpendicular to the airsream.

Explosive cartridges, such as Cartridge Activated Devices (CAD) currently used on the P-3 aircraft, have been used in launch systems to eject sonobuoys and other stores from aircraft from within the Sonobuoy Launch Containers (SLC's). The stores and cartridges, with the SLCs, are loaded into the launch array system prior to take-off and inside the aircraft for the manual release system. The explosive cartridges generate high-pressure gas for actuating the release mechanism and actuating the ejector ram to forcibly eject the store away from the aircraft. The store is ejected away from the aircraft and approximately 45 degrees aft with respect to the air stream. Unfortunately, the external array of launchers do not allow changes to buoy selection or parameter settings after take-off and the internal manual launchers must be reloaded by personnel after each firing. Additionally, handling and storage of the cartridges poses a safety risk to personnel. Another disadvantage of these launch systems is that the number of stores that may be deployed during flight is limited to the number of stores that may be loaded in the array of launchers prior to take-off. Another disadvantage of the manual launch systems is the time to reload each launcher does not allow sonobuoys to spaced in the water at the desired intervals without alternate use of the external launcher array. Another disadvantage is this method uses the Sonobuoy Launch Container, each weighing up to 5 pounds, to load and eject the sonobuoys from the aircraft. Carrying this weight reduces the available payload weight for other mission equipment or cargo.

A sonobuoy launch system using gas cartridges is disclosed in U.S. Pat. No. 5,155,288. In this system, the buoys are stacked vertically and sequentially inside the Sonobuoy Launch Container. These SLC's are loaded into the P-3 or other aircraft launcher arrays. Individual compressed gas cartridges propel the buoys vertically away from the aircraft, perpendicular to the airstream. Buoy deployment is possible using this system; however, similar disadvantages to the P-3 style explosive device exist with exception for the personnel hazards from the Cartridge activated devices.

A gravity launching system is disclosed in U.S. Pat. No. 5,160,101. In this system the bare sonobuoys (sonobuoys without Sonobuoy Launch Containers) are stored vertically and dropped through the floor of the aircraft. This system allows access for buoy reconfiguration in flight and it does not require the use of explosive cartridges. However, it is necessary to position the launcher at the deepest section of the cabin to maximize buoy drop time before the buoys enter the airstream to achieve an acceptable exit velocity in order to clear the aircraft. Antennas, landing gear, airfoil stabilizers, and other aft structures may be damaged if contacted by the buoys during deployment. Although this system provides launching capability up to 150 knots and does not require explosive cartridges, a system is needed wherein sonobuoy deployment is possible at higher aircraft speeds. At higher speeds, the sonobuoy does not gain enough velocity to clear the aircraft without damage to the aircraft or sonobuoy. Additionally, the aircraft must maintain level flight within 10 degrees for the gravity drop system to work correctly. Further, in a pressurized aircraft above 10,000 feet, a two gate drop system must be employed to drop the sonobuoy into the airstream while maintaining a pressurized aircraft. Unfortunately, this will effectively reduce the exit velocity and prevent a clean separation of the sonobuoy from the aircraft. A two gate drop system in a pressurized aircraft would involve dropping the sonobuoy into a launch tube, closing a pressurized seal or "gate" behind it to isolate the sonobuoy from the pressurized aircraft. A second gate below it on the bottom of the aircraft would open to the airstream and allow the sonobuoy to fall.

As can be seen, there is a need for improved systems and methods for launching stores. Specifically, an improved system and method for launching sonobuoys from aircraft are needed. Further, an improved system and method are needed wherein sonobuoy ejection does not require the use of explosive cartridges. Also needed is an improved system and method for launching sonobuoys wherein maintenance cost and space requirements are decreased. A system and method are also needed wherein safety risk to personnel is decreased. Additionally, an improved system and method for launching sonobuoys from an aircraft at any speed or altitude is needed. Also needed is a system and method for launching sonobuoys wherein in-flight sonobuoy programming is possible. An improved system and method are needed for rapidly launching stores of multiple sizes. A system and method are also needed wherein the number of buoys that may be deployed during flight is not limited to the number of buoys that may be loaded into the launch tubes prior to take-off. Also, an improved system is needed that limits the amount of personnel handling during launching operations.

SUMMARY OF THE INVENTION

In one aspect of the present invention, a system for launching a store from a vehicle comprises at least one clam-shell launch tube capable of receiving said store and capable of radially releasing said store.

In another aspect of the present invention, a system for launching a store from a vehicle comprises at least one clam-shell launch tube having a longitudinal slit, at least one support arm in contact with said launch tube, and at least one pneumatic firing mechanism in contact with said support arm.

In another aspect of the present invention, a system for launching a store from a vehicle comprises at least one clam-shell launch tube capable of receiving the store and capable of radially releasing the store, at least one support arm in contact with the launch tube, a pressure boundary structure surrounding the launch tube and the support arm, and the structure in contact with an outer surface of the vehicle, at least one rotary door positioned on the outer surface, and the door is capable of forming a pressure seal, at least one actuator (hydraulic, pneumatic mechanical spring or electric) in contact with the rotary door, the actuator is capable of opening the launch tube, and the actuator is capable of propelling the store from the door, and at least one gate positioned on the structure, such that the store is capable of being loaded into the launch tube there though, and the gate is capable of forming a pressure seal.

In yet a further aspect of the present invention, a method for launching a store from a vehicle comprises the steps of loading the store into a clam-shell launch tube, the launch tube is capable of receiving the store and capable of radially releasing the store, and actuating a firing mechanism, such that the store is radially propelled from the launch tube.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention may be useful in the launching of stores, particularly the launching of stores from aircraft. The stores, which are referred to in this invention, may include sonobuoys, chaff buoys, munitions, marker buoys, and other stores. The present invention launches stores from the launcher without the use of Sonobuoy Launch containers (SLC). The present invention may be useful in the launching of stores from aircraft, such as fixed-wing planes and helicopters, ships, vessels and others.

The present invention generally provides a system and method for radially launching stores from a vehicle utilizing a clam-shell launch tube. In pressurized vehicles, such as aircraft, the launch tubes may be reloaded without compromising cabin pressure. The present invention may find beneficial use in many industries including aircraft manufacturing, shipbuilding, oceanographic surveying, sonobuoy launch systems manufacturing, and others.

The present invention may provide a system and method for launching a store from a vehicle. The system may comprise a clam-shell launch tube to receive a store, a firing mechanism in contact with the launch tube to radially eject the store, a pressure boundary structure surrounding the launch tube and firing mechanism and the structure in contact with the vehicle's outer surface, a door on the vehicle's outer surface through which a store may be radially ejected, and a gate on the boundary structure's forward or aft side through which a store may be loaded into the launch tube. Unlike the prior art, the store may be radially, as opposed to vertically ejected from the launch tube through the floor. The radial ejection of the sonobuoy may result in the sonobuoy entering the air stream about parallel to the air stream as opposed to perpendicular to the air stream. After ejecting a store, the firing mechanism and launch tube may be retracted and the door may be closed. Also unlike the prior art, a gate may then be opened and the launch tube may be reloaded to eject additional stores during flight. Cabin pressure may be maintained while reloading the launch tube and ejecting the store. This is also unlike the prior art.

Figure 1:
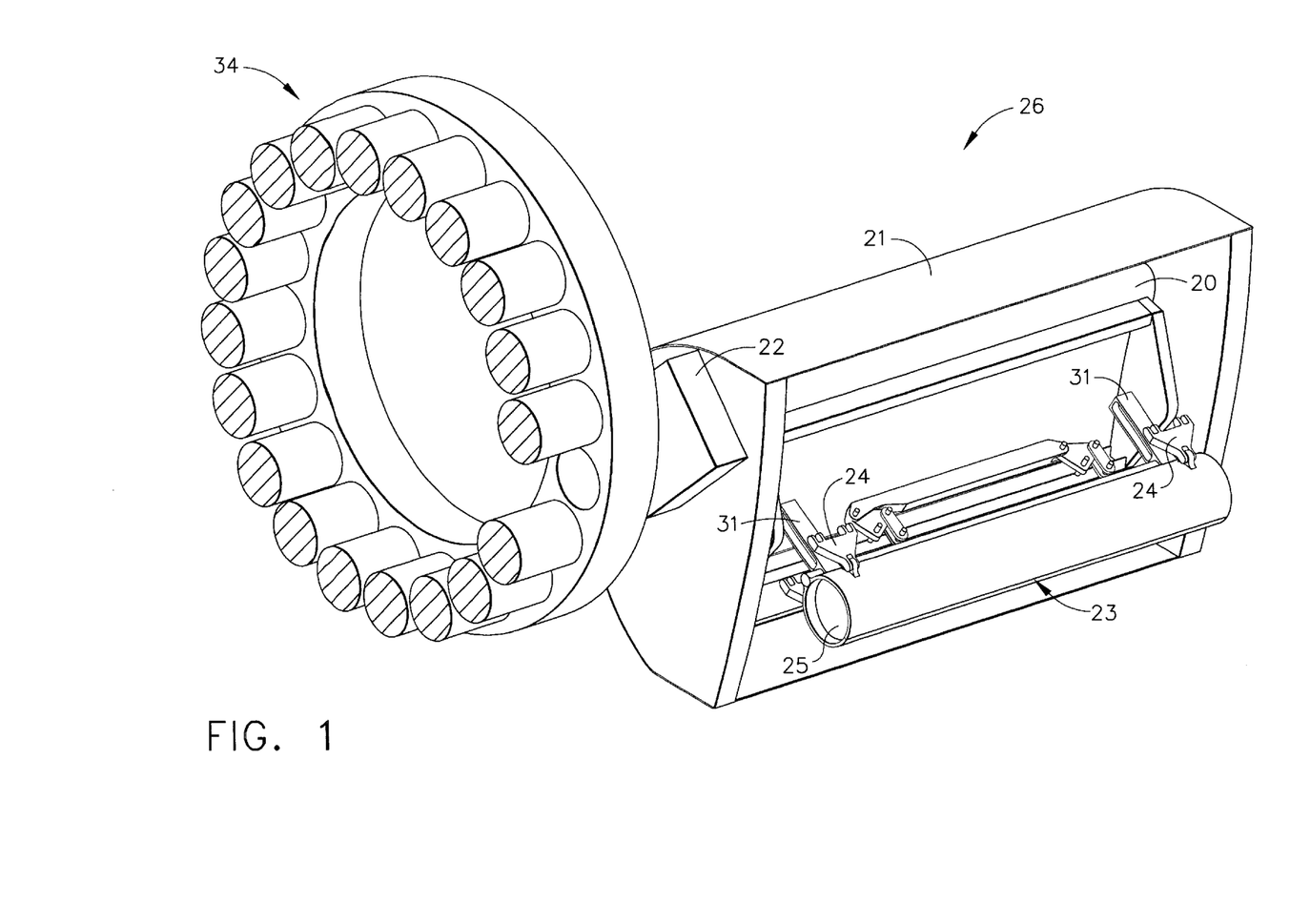
FIG. 1 is a schematic drawing of a radial sonobuoy launcher in a launch position according to an embodiment of the present invention.

FIG. 1 depicts a schematic drawing of a radial sonobuoy launcher 26 in a launch position according to an embodiment of the present invention. The radial sonobuoy launcher 26 may comprise a door 20, a pressure boundary structure 21, a gate 22, a clam-shell launch tube 23, a support arm 24, a firing mechanism (not shown), and a rotary dispenser 34. In this figure, the door 20 is in an open position and a sonobuoy 25 is loaded in the clam-shell launch tube 23. The gate 22 is in a closed position allowing cabin pressure to be maintained. With the door 20 in an open position, the support arms 24 and firing mechanism (not shown) may push the clam-shell launch tube 23 away from a vehicle. The firing mechanism may comprise one or more drive arms 31 in contact with the clam-shell launch tube 23.

Figure 2:
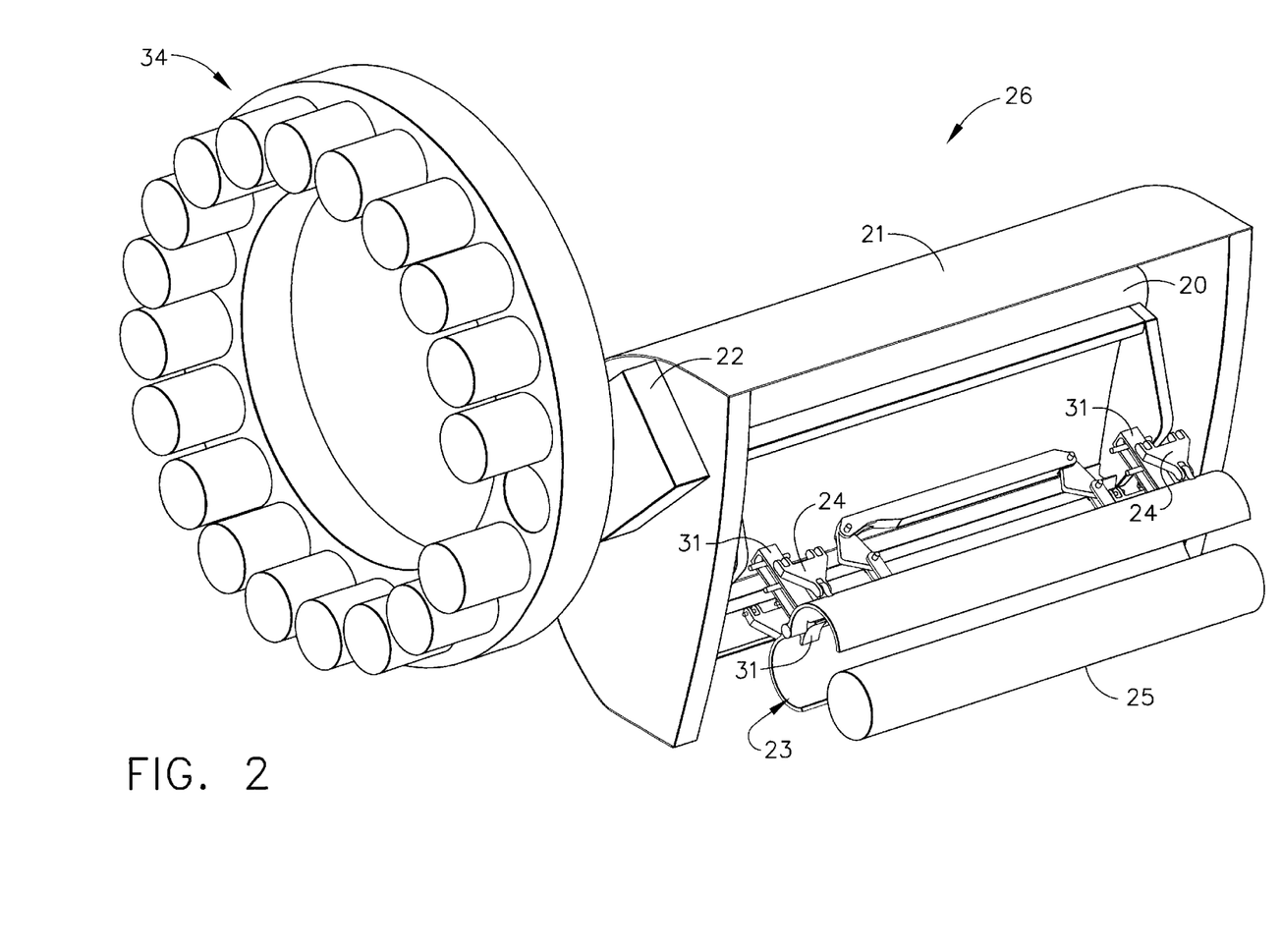
FIG. 2 is a schematic drawing of a radial sonobuoy launcher in an ejected position according to an embodiment of the present invention.

In FIG. 2, a schematic drawing of a radial sonobuoy launcher in an ejected position, according to an embodiment of the present invention, is depicted. In this figure, the door 20 is also in an open position. A firing mechanism (not shown), such as a pneumatic actuator, may simultaneously push the clam-shell launch tube 23 and release the sonobuoy 25. After the sonobuoy 25 is deployed, the clam-shell launch tube 23 may be closed and retracted for reloading.

Figure 3:
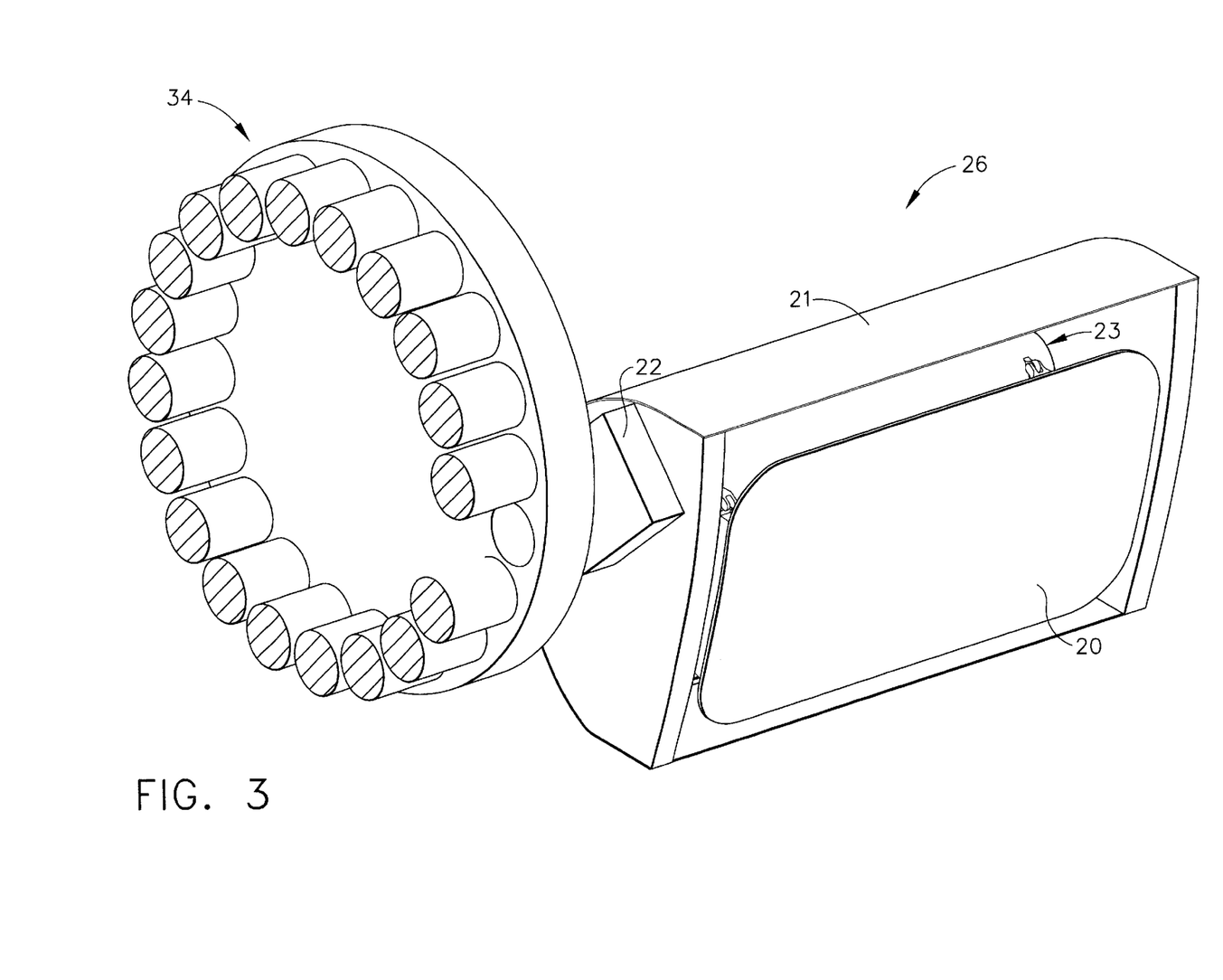
FIG. 3 is a schematic drawing of a radial sonobuoy launcher in a static/loading position according to an embodiment of the present invention.

In FIG. 3, a schematic drawing of a radial sonobuoy launcher in a static/loading position, according to an embodiment of the present invention, is depicted. In this figure, the door 20 is in a closed position. With the door 20 in this position the gate 22 can be opened to load the clam-shell launch tube 23 without compromising the air pressure within the vehicle cabin.

Figure 4A:
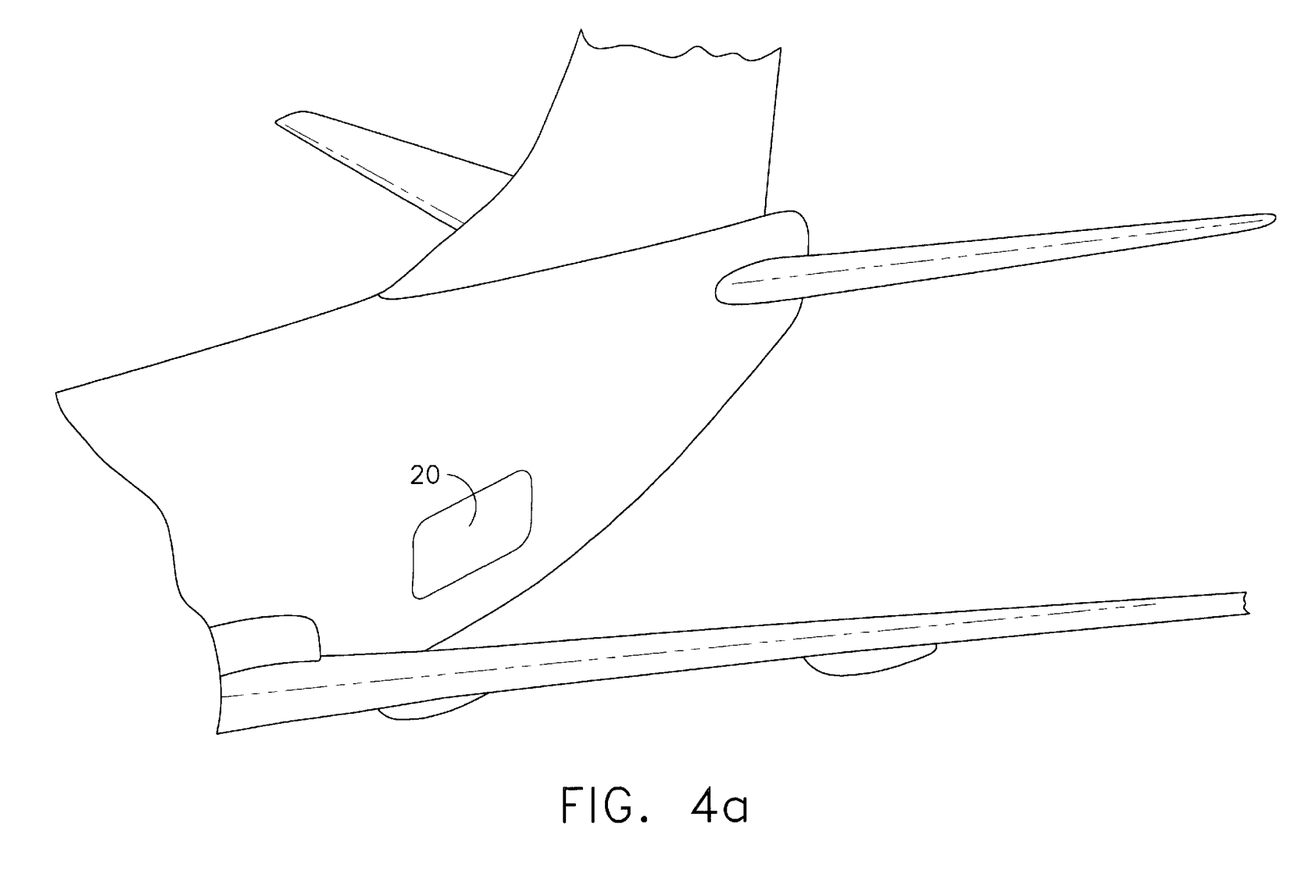
FIG. 4a is a schematic drawing of a radial sonobuoy launcher, in a static/loading position, installed in the aft section of an aircraft according to an embodiment of the present invention.
Figure 4B:
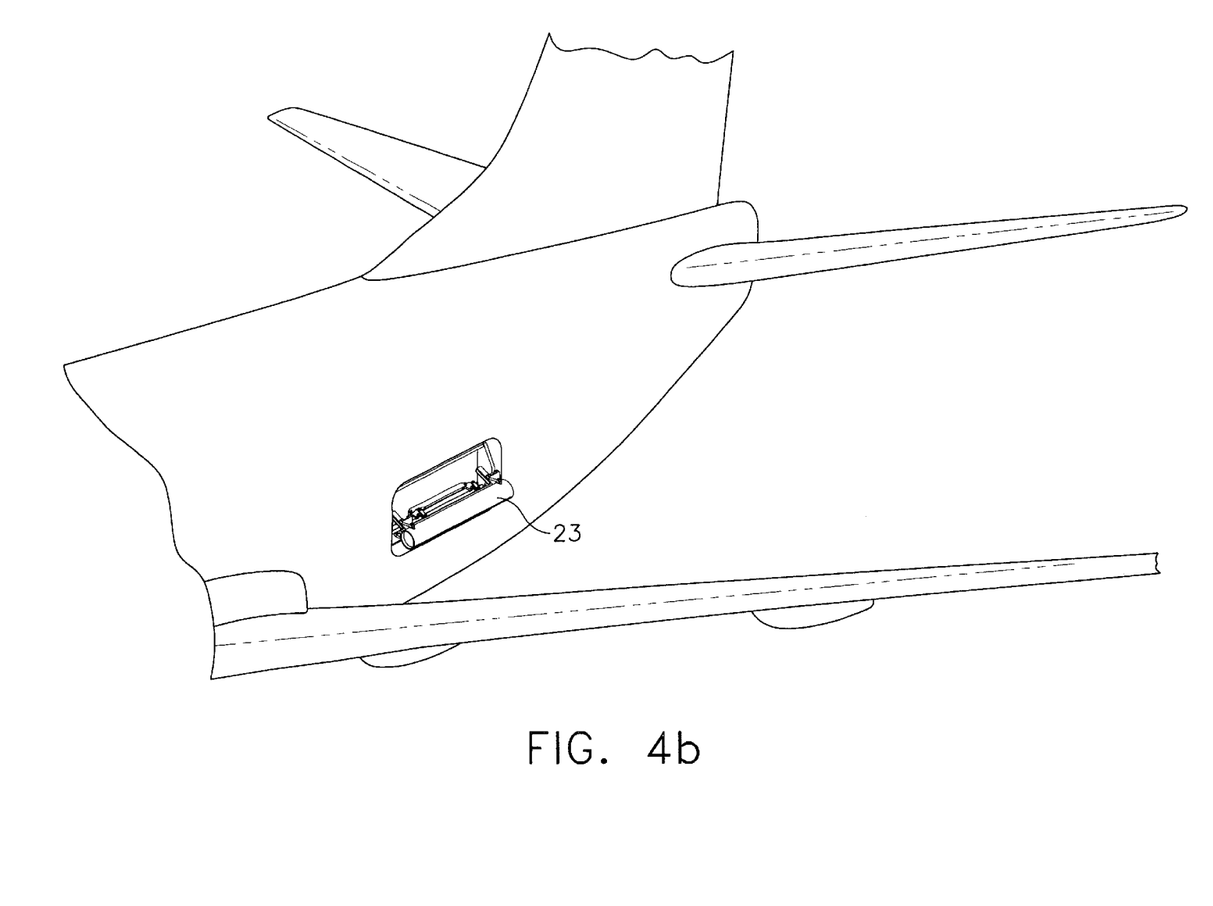
FIG. 4b is a schematic drawing of a radial sonobuoy launcher, in a launch position, installed in the aft section of an aircraft according to an embodiment of the present invention.
Figure 4C:
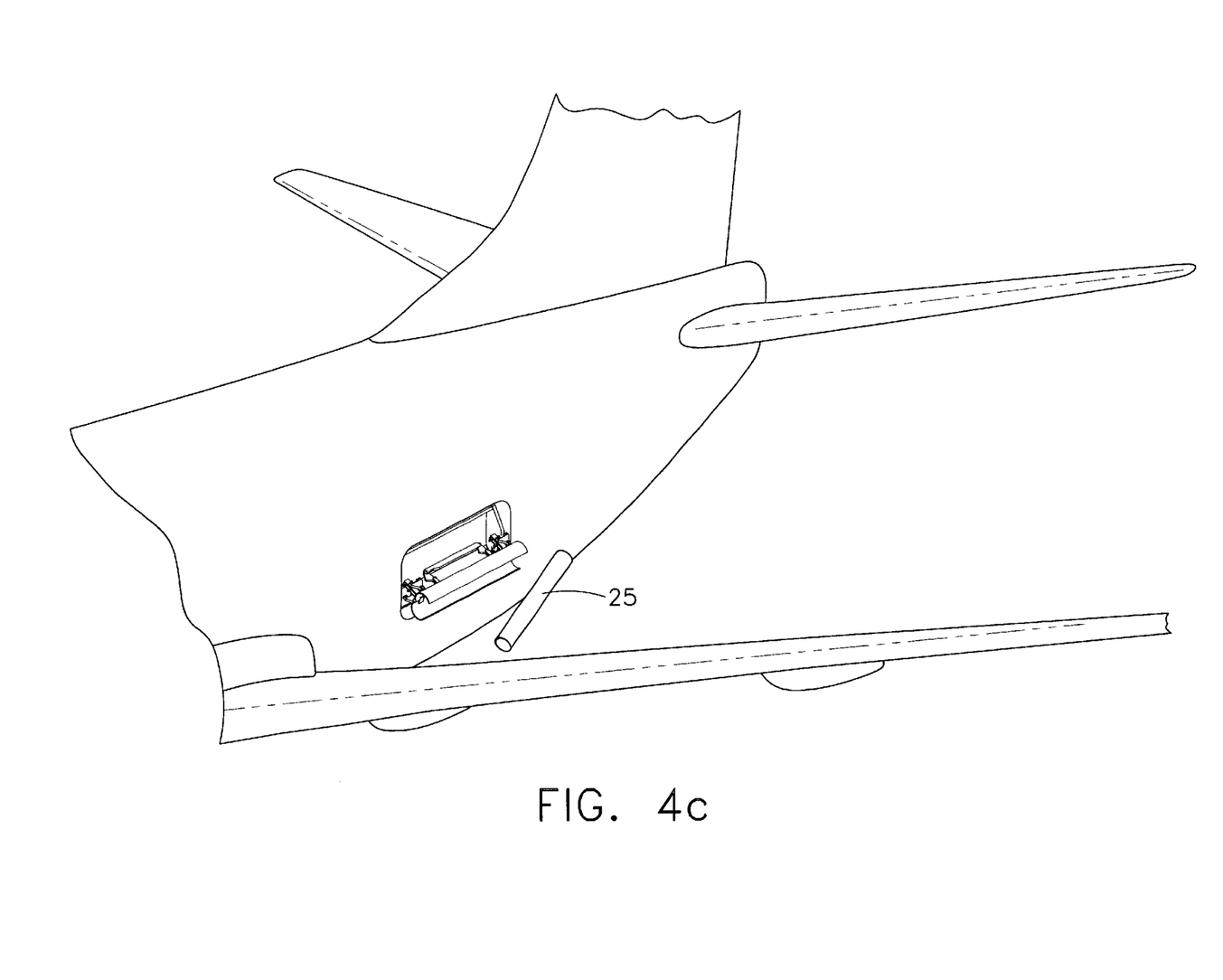
FIG. 4c is a schematic drawing of a radial sonobuoy launcher, in an ejected position, installed in the aft section of an aircraft according to an embodiment of the present invention.

FIGS. 4a, 4b, and 4c are schematic drawings of a radial sonobuoy launcher installed in the aft section of an aircraft according to an embodiment of the present invention. In FIG. 4a, the door 20 is closed and the launcher is in a static/loading position. In FIGS. 4b and 4c, the door is open and the launcher is in a launch position and an ejected position, respectively. When the door 20 is open, a launch tube 23 may be exposed to the exterior of the vehicle and a sonobuoy 25 may be ejected. In these figures the door 20 is a rotary door having an outer surface and an inner surface. From a closed position the door may rotate 180° to an open position. A pneumatic firing mechanism and a launch tube may be in contact with the inner surface of the door.

A sonobuoy 25 may be deployed by the launcher system 26 of the present invention. Available sonobuoys may be cylindrical and have a diameter of about 5 inches. Sonobuoys may be available in lengths of about one foot to about three feet. Other stores having different dimensions may be available. Other stores may include chaff buoys, munitions and marker buoys. A store of any dimensions smaller than the clam-shell launch tube 23 may be launched using the present invention.

Figure 5A:
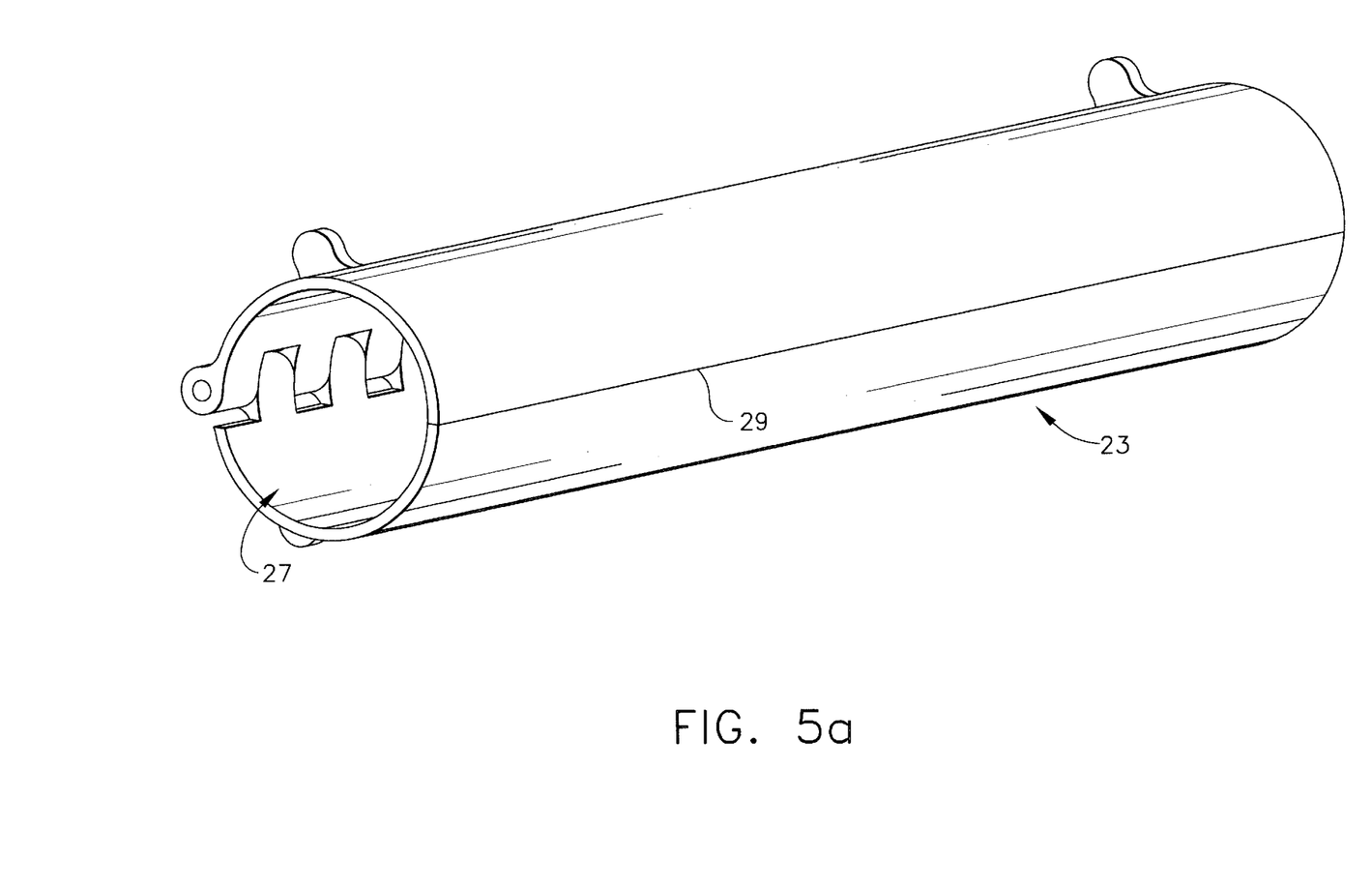
FIG. 5a is a schematic drawing of a clam-shell launch tube in a static/loading position according to an embodiment of the present invention.
Figure 5B:
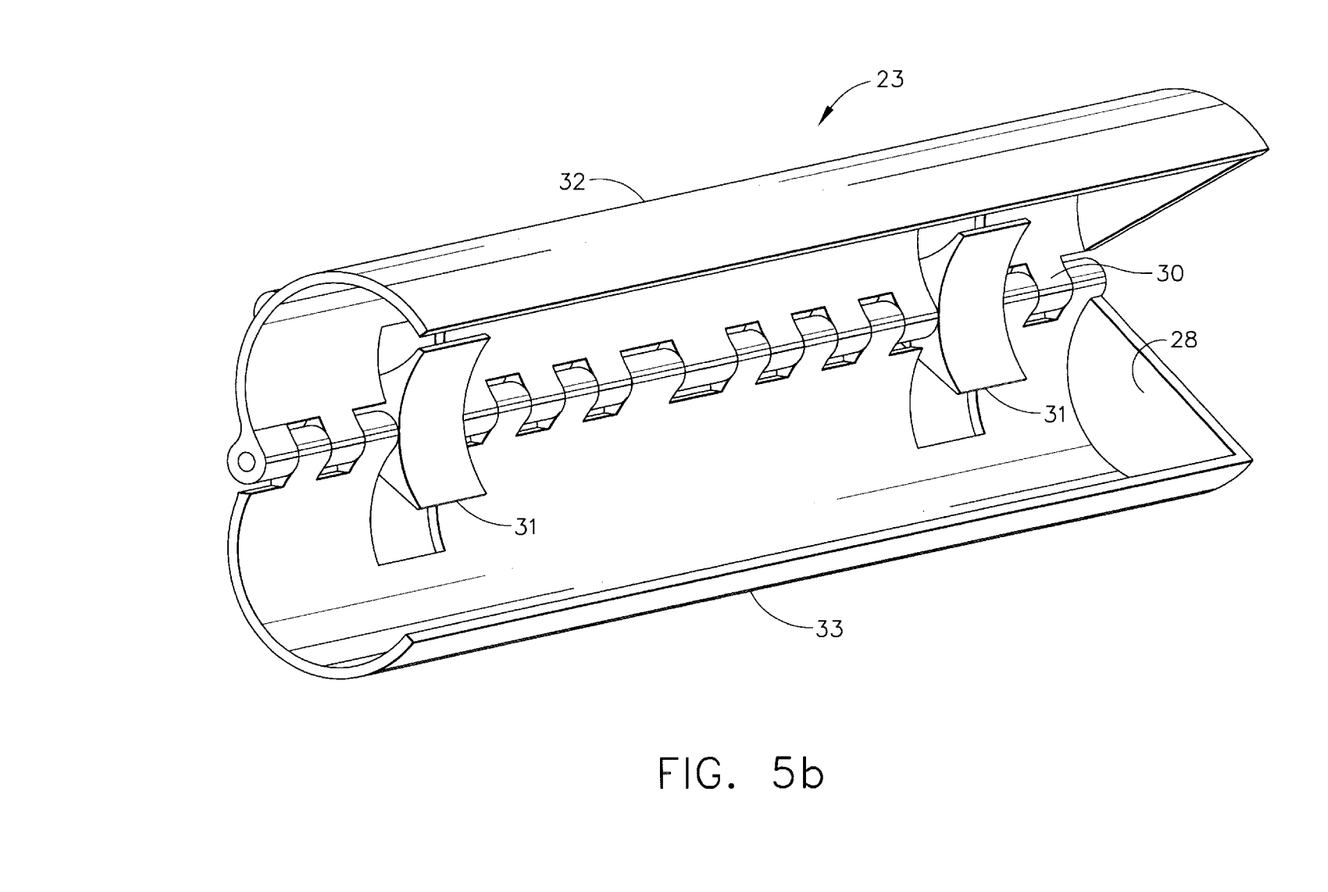
FIG. 5b is a schematic drawing of a clam-shell launch tube in an ejected position according to an embodiment of the present invention.

FIGS. 5a and 5b are schematic drawings of a clam-shell launch tube 23 according to an embodiment of the present invention. In FIG. 5a, the clam-shell launch tube 23 is in a static/loading position. In FIG. 5b, the clam-shell launch tube 23 is in an ejected position. A clam-shell launch tube 23 may be a cylindrical tube having an aft end and a forward end. As seen in FIG. 5a, at one end may be an opening 27 capable of receiving a sonobuoy. As seen in FIG. 5b, a barrier 28, capable of preventing the passage of a sonobuoy, may be at the other end. For example, a clam-shell launch tube 23 may be a cylinder having an opening 27 at the forward end through which a sonobuoy may be loaded and a barrier 28 at the aft end. The barrier 28 may prevent the sonobuoy from being pushed through the aft end, such as by air stream forces.

As seen in FIG. 5a, the clam-shell launch tube 23 may have a longitudinal slit 29. The clam-shell launch tube 23 may be capable of opening along the longitudinal slit 29 to allow a sonobuoy to be propelled there through. A useful clam-shell launch tube 23 may have a longitudinal hinge 30. As seen in FIG. 5b, the hinge 30 may allow the clam-shell launch tube 23 to open along the slit 29 and a firing mechanism (not shown) comprising drive arms 31 may be in contact with the clam-shell launch tube 23. The clam shell launch tube may also be in the form of a series of clasps to hold a sonobuoy in place instead of the described clam shell launch tube.

A useful clam-shell launch tube 23 may comprise plastic, aluminum, fiberglass, and other materials. The length of the preferred clam-shell launch tube 23 may be at least that of the sonobuoy 25 to be launched. The length of the clam-shell launch tube 23 may vary with application. For example, for launching one, two and/or three foot long stores, a clam-shell launch tube 23 having a length of at least about three feet may be useful. The launch tube length may be between about one foot and about eight feet. The inside diameter of the clam-shell launch tube 23 may depend on the diameter of the sonobuoy 25 to be launched. The inside diameter of the clam-shell launch tube 23 may be about 5 inches. The inside diameter may also be larger or smaller than 5 inches to accommodate different size stores from the standard sonobuoy size. A useful inside diameter of the clam-shell launch tube 23 may be at least about the diameter of the sonobuoy 25 to be launched.

Figure 6A:
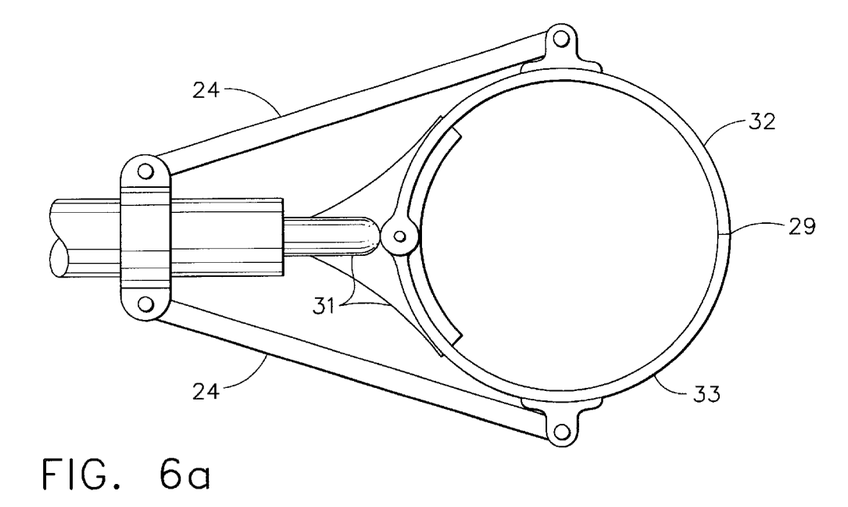
FIG. 6a is an end view of a clam-shell launch tube and two support arms in a static/loading position according to an embodiment of the present invention.
Figure 6B:
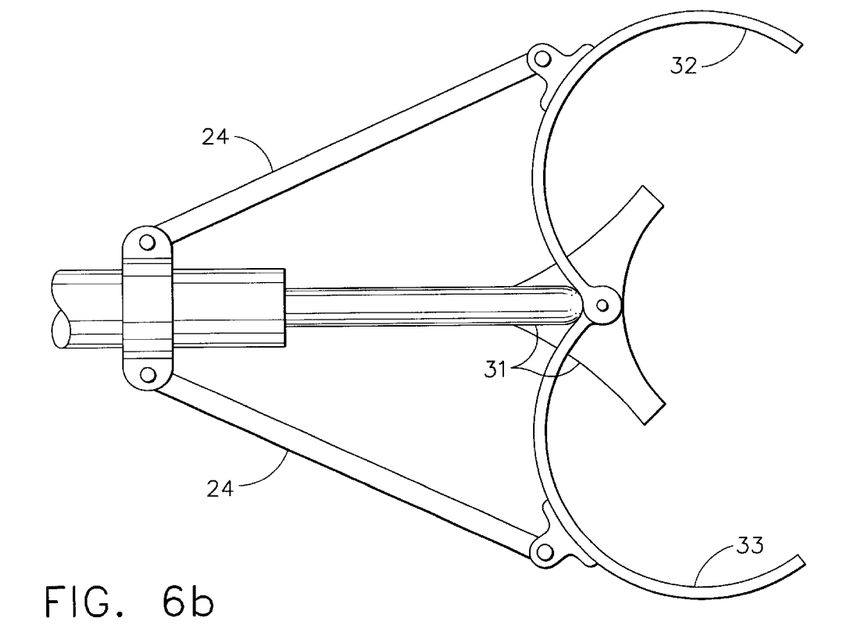
FIG. 6b is an end view of a clam-shell launch tube and two support arms in an ejected position according to an embodiment of the present invention.

A clam-shell launch tube may comprise a tube top side and a tube bottom side. As seen in FIGS. 6a and 6b, support arms 24 may be in contact with the tube top side 32 and the tube bottom side 33. There may be more than one support arm 24. One support arm 24 may be in contact with the entire length of the clam-shell launch tube 23. The support arms 24 may evenly distribute the ejection accelerations from the firing mechanism. The support arms 24 may guide the trajectory of the sonobuoy 25 during release by preventing the sonobuoy from dropping off center into either the tube top side 32 or the tube bottom side 33 during the ejection and subsequent opening of the clam-shell launch tube (23). This prevents the sonobuoy from ejecting in a direction other than is intended. Any device capable of supporting the clam-shell launch tube 23 may be useful in the present invention. Any device capable of opening a clam-shell launch tube 23 during sonobuoy 25 ejection or capable of closing a clam-shell launch tube 23 after sonobuoy 25 ejection may be useful in the present invention. These devices may be mechanical.

The support arm 24 may be in contact with a firing mechanism, such as a pneumatic actuator. The combination of the firing mechanism and support arm 24 may be capable of pushing the clam-shell launch tube 23 away from the aircraft and simultaneously opening the clam-shell launch tube 23 along the slit 29, such that a sonobuoy 25 may be propelled radially from the clam-shell launch tube 23.

FIGS. 6a and 6b are end views of a clam-shell launch tube 23 according to an embodiment of the present invention. In FIG. 6a, the clam-shell launch tube 23 is in a static/loading position. In FIG. 6b, the clam-shell launch tube 23 is in an ejected position. The firing mechanism (not shown) may comprise a drive arm 31. The firing mechanism (not shown) may be in contact with a drive arm 31. The drive arm 31 may guide the trajectory of the sonobuoy 25 during release by preventing the sonobuoy from dropping off center into either the tube top side 32 or the tube bottom side 33 during the ejection and subsequent opening of the clam-shell launch tube. The firing mechanism may be a pneumatic actuator having a drive arm 31. Pneumatic actuators may be supplied by high-pressure gas stored in a tank, a gas generator system, or the aircraft's pneumatic system. Useful pneumatic actuators may include the pneumatic actuators described in U.S. Pat. No. 5,857,647, which is herein incorporated by reference.

The firing mechanism may comprise a hydraulic or electric actuator. The firing mechanism may be spring activated. The firing mechanism may be in contact with at least one support arm 24. The support arm 24 may be in contact with the clam-shell launch tube 23, such that the clam-shell launch tube 23 may open along the slit 29 when the firing mechanism is operated. In FIGS. 6a and 6b, for example, one support arm 24 may be pivotally connected to a tube top side 32 and another support arm 24 may be pivotally connected to a tube bottom side 33. When the firing mechanism is operated, the clam-shell launch tube 23 may be urged forward by a drive arm 31 causing the tube top side 32 and tube bottom side 33 to separate at a slit 29, thereby releasing the sonobuoy 25. The drive arm 31 may then retract and the support arms 24 may urge the tube top side 32 and tube bottom side 33 back together. The clam-shell launch tube 23 may then be reloaded.

The clam-shell launch tube 23 may be positioned such that it may release a sonobuoy 25 about parallel to the air stream. The affect of air stream forces on a sonobuoy 25 may be a function of the surface area of the sonobuoy 25 acted upon by the air stream forces. The air stream forces may have a lesser affect on a sonobuoy 25 parallel to the air stream than a sonobuoy 25 perpendicular to the air stream during the initial stages of launch. This may be because a smaller surface area of the sonobuoy 25 may be facing the oncoming air stream forces.

The release velocity of the sonobuoy 25 may vary. A useful release velocity may depend on factors such as vehicle configuration, vehicle speed, angle of sonobuoy 25 ejection, weather conditions, weight of sonobuoy 25, and others. For example, the release velocity may be higher when the vehicle speed is higher and all other factors remain the same. A minimum release velocity may be the velocity necessary to avoid the sonobuoy 25 striking the vehicle after release.

The launcher system 26, as seen in FIG. 2, may comprise a pressure boundary structure 21. The boundary structure 21 may surround the clam-shell launch tube 23 and the support arms 24. The boundary structure 21 may be capable of being pressurized. The structure 21 may be comprised of aluminum or any suitable material. The boundary structure 21 may be located within the cabin of a vehicle and it may be in contact with the surface of the vehicle. For example, the boundary structure 21 may be inside the cabin of an aircraft and it may be in contact with the outer surface of the aircraft. A side of the boundary structure 21 may be a portion of the vehicle's outer surface. The structure 21 may have a door 20 and a gate 22, as seen in FIGS. 1 and 3.

A door 20 of the present invention may be opened and closed electrically, pneumatically, hydraulically, or manually. Additionally, the door 20 may be opened by more than one method. For example, a door 20 may open hydraulically and also have manual back-up capability. Useful actuator operated doors and manual override systems may include those described in U.S. Pat. No. 5,160,101, which is herein incorporated by reference. A hydraulic or electric rotary actuator may rotate the door 20 into an open or closed position. When in a closed position, the door 20 may allow the air pressure within the vehicle to be maintained. Useful doors may include the doors described in U.S. Pat. No. 4,720,065, which is herein incorporated by reference. The door 20 may be a refueling type door. The door 20 may be positioned on the surface of a vehicle, such as on an aircraft skin. When a door 20 is in an open position, stores, such as sonobuoys 25, may be propelled from the interior of the pressure boundary structure 21 to the exterior of the vehicle. The door 20 may be connected to the surface of the vehicle by a door hinge or other means. The door 20 may rotate, pivot, slide, or revolve to open and close. For one embodiment the door 20 may be an electrically or hydraulically operated rotary door.

A gate 22 may be positioned on the pressure boundary structure 21. Although, the gate 22 may be located on any side of the pressure boundary structure 21, the forward side may be preferred. The gate 22 may be positioned axial to the clam-shell launch tube 23. For example, when a launcher system 26 is positioned in the aft section of an aircraft, a gate 22 on the forward side of the boundary structure 21 instead of the aft side may be preferred. In this example, there may be sufficient cabin space on the forward side of the pressure boundary structure 21 in which to place a rotary dispenser 34 for buoy loading. The gate 22 of the present invention may be opened and closed electrically, pneumatically, hydraulically, or manually. The gate 22 may pivot, slide, or rotate to open. When in a closed position, the gate 22 may be sealed such that the air pressure within the vehicle may be maintained when a door 20 is in an open position. A sonobuoy 25 may be loaded into a clam-shell launch tube 23 by passing the sonobuoy 25 through an open gate 22. The sonobuoy 25 may be loaded into the clam-shell launch tube 23 by passing through the gate 22 and the opening 27. The loading of the clam-shell launch tube 23 may be manual or automated. Rotary dispensers 34 may be used for automatic sonobuoy 25 loading. A piston, spring or other mechanical mechanism may push a sonobuoy 25 through the gate 22 and into a clam-shell launch tube 23.

A launch system 26 of the present invention may comprise more than one clam-shell launch tube 23. For example, more than one clam-shell launch tube 23 may be placed on a door 20 that rotates into the aircraft. The door 20 may rotate about an axis, such that in a closed position the door 20 may form a pressure seal and in an open position the door 20 may be inside the pressure boundary structure 21. The door 20 may rotate to more than one position for loading or there may be more than one gate 22. By having more than one gate, more than one clam-shell launch tube 23 may be loaded simultaneously. The door 20 may rotate to more than one position for launching.

In a second example, the launch system 26 of the present invention may also comprise more than one clam-shell launch tube 23. For example, more than one clam-shell launch tube 23 may be in contact with a pressure boundary structure 21. The pressure boundary structure 21 may have more than one gate 22. By having more than one gate 22, more than one clam-shell launch tube 23 may be loaded simultaneously. For example, a multitude of clam-shell launch tubes 23 may be simultaneously positioned axial to a multitude of gates 22 for loading. Additionally, the pressure boundary structure 21 may have one gate 22, and a multitude of clam-shell launch tubes 23 may be rotated and sequentially loaded there through. A door 20 may pivot, slide or rotate open to allow for sonobuoy 25 launching.

In another example, one clam-shell launch tube 23, firing mechanism and support arm 24 may be attached to both sides of a door 20. The door 20 may pivot 180° along a central axis of the door such that a pressure seal is formed in two positions. In this example, one clam-shell launch tube 23 may be outside the vehicle in a launch position while a second clam-shell launch tube 23 may be inside the pressure boundary structure 21 in a static/loading position.

Figure 7:
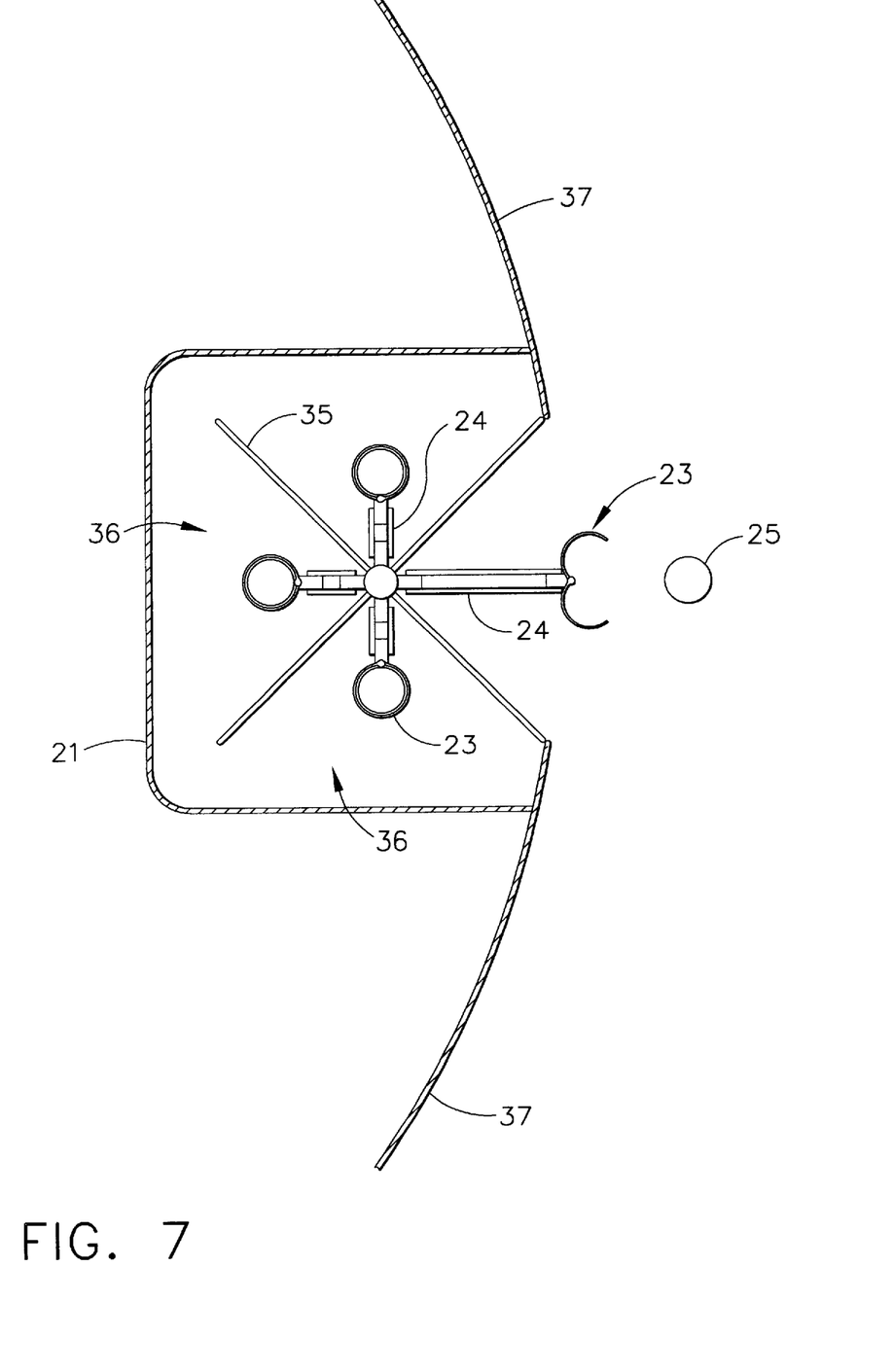
FIG. 7 is a schematic cross-section of a radial sonobuoy launcher according to an embodiment of the present invention.

In another example, as seen in FIG. 7, the door may comprise a horizontal revolving door 35 having three or more sections 36, similar to a revolving entry door on a building turned sideways. One clam-shell launch tube 23, firing mechanism (not shown) and support arm 24 may be positioned within each section 36. Each section 36 may be capable of forming a pressure seal with an aircraft skin 37. A pressure boundary structure 21 may surround the horizontal revolving door 35. A gate (not shown) may be axial to a clam-shell launch tube 23. In this example, the gate may be open for loading a clam-shell launch tube 23 while a sonobuoy 25 is being launched from a second clam-shell launch tube 23, without compromising the cabin air pressure. Also, in this example, it would not be necessary for a clam-shell launch tube 23 to remain outside the aircraft as it may be retracted into the section 36 after launching. Additionally, an exterior door (not shown), such as an internally retracted door may be placed on the aircraft skin 37. This may allow a section 36, when exposed to the exterior of the aircraft, to be sealed when the launch system 26 is not in use.

As can be appreciated by those skilled in the art, the present invention provides improved systems and methods for radially launching stores from vehicles. Also provided is a system for rapidly launching sonobuoys of multiple sizes such that the sonobuoys are launched parallel to the air stream and wherein in-flight sonobuoy programming and loading are possible. The present invention provides a system and method for launching sonobuoys from an aircraft at any speed or altitude, wherein sonobuoy ejection does not require the use of explosive cartridges and cabin pressure is maintained. A system and method are also provided wherein the reliability of the system is increased and safety risk to personnel and maintenance costs are decreased.

It should be understood, of course, that the foregoing relates to preferred embodiments of the invention and that modifications may be made without departing from the spirit and scope of the invention as set forth in the following claims.

We claim:

1. A system for launching a store from a vehicle comprising:
    at least one clam-shell launch tube capable of receiving said store and capable of radially releasing said store;
    a pressure boundary structure surrounding said launch tube, said structure in contact with an outer surface of said vehicle; and
    at least one rotary dispenser positioned outside said pressure boundary structure, said rotary dispenser capable of loading said store into said launch tube.

2. The system as claimed in claim 1, further comprising at least one firing mechanism positioned such that said firing mechanism is capable of engaging said launch tube and capable of propelling said store.

3. The system as claimed in claim 1, further comprising at least one door positioned on said outer surface, such that said firing mechanism is capable of propelling said store there through, and said door is capable of forming a pressure seal.

4. The system as claimed in claim 3, wherein said door is a revolving door.

5. The system as claimed in claim 3, wherein said door is a rotary door.

6. The system as claimed in claim 3, wherein said firing mechanism is in contact with said door.

7. The system as claimed in claim 2, wherein said firing mechanism is a pneumatic actuator.

8. The system as claimed in claim 2, further comprising at least one support arm in contact with said launch tube, and said support arm is capable of opening said launch tube.

9. The system as claimed in claim 2, further comprising at least one drive arm positioned such that said drive arm is capable of engaging said launch tube and capable of guiding the trajectory of said store.

10. The system as claimed in claim 1, further comprising at least one gate positioned on said structure, such that said store is capable of being loaded into said launch tube there though, and said gate is capable of forming a pressure seal.

11. The system as claimed in claim 1, further comprising at least one gate positioned on said structure, such that said store is capable of being loaded into said launch tube there though, and said gate is capable of forming a pressure seal; and
    at least one door positioned on said outer surface, such that said firing mechanism is capable of propelling said store there through, and said door is capable of forming a pressure seal.

12. The system as claimed in claim 11, wherein said door is a rotary door.

13. The system as claimed in claim 11, wherein said firing mechanism is in contact with said door.

14. The system as claimed in claim 11, wherein said firing mechanism is a pneumatic actuator.

15. The system as claimed in claim 11, further comprising at least one support arm in contact with said launch tube, and said support arm is capable of opening said launch tube.

16. The system as claimed in claim 11, further comprising at least one drive arm positioned such that said drive arm is capable of engaging said launch tube and capable of guiding the trajectory of said store.

17. A system for launching a store from a vehicle comprising:
    at least one clam-shell launch tube having a longitudinal slit;
    at least one support arm in contact with said launch tube;
    at least one pneumatic firing mechanism in contact with said support arm, said firing mechanism being capable of ejecting said store in a direction away from said launch tube;
    a pressure boundary structure surrounding said launch tube and said firing mechanism, and said structure in contact with an outer surface of said vehicle;
    at least one gate positioned on said structure, such that said store is capable of being loaded into said launch tube there through, and said gate is capable of forming a pressure seal; and
    at least one rotary dispenser positioned outside said pressure boundary structure and inside said vehicle, said rotary dispenser capable of loading said store into said launch tube.

18. The system as claimed in claim 17, further comprising at least one door positioned on said outer surface, such that said firing mechanism is capable of propelling said store there through, and said door is capable of forming a pressure seal.

19. The system as claimed in claim 18, wherein said door is a revolving door.

20. The system as claimed in claim 18, wherein said door is a rotary door.

21. The system as claimed in claim 20, wherein said firing mechanism is in contact with said door.

22. A system for launching a store from a vehicle comprising:
    at least one clam-shell launch tube capable of receiving said store and capable of radially releasing said store;
    at least one support arm in contact with said launch tube;
    a pressure boundary structure surrounding said launch tube and said support arm, and said structure in contact with an outer surface of said vehicle;
    at least one rotary door positioned on said outer surface, and said door is capable of forming a pressure seal;
    at least one drive arm positioned such that said drive arm is capable of engaging said launch tube and capable of guiding the trajectory of said store;
    at least one pneumatic actuator in contact with said rotary door, said actuator is capable of opening said launch tube, and said actuator is capable of propelling said store through said door;
    at least one gate positioned on said structure, such that said store is capable of being loaded into said launch tube there though, and said gate is capable of forming a pressure seal; and at least one rotary dispenser positioned outside said pressure boundary structure and inside said vehicle, said rotary dispenser capable of loading said store into said launch tube.

23. A method for launching a store from a vehicle comprising the steps of:
providing at least one clam-shell launch tube for receiving said store, said launch tube being capable of radially releasing said store;
providing a pressure boundary structure surrounding said launch tube;
providing a rotary dispenser positioned outside said structure and within said vehicle;
providing at least one gate positioned on said structure;
loading said store into said clam-shell launch tube by said rotary dispenser through said gate; and
actuating a firing mechanism, such that said store is radially propelled from said launch tube.

24. The method as claimed in claim 22, further comprising the step of providing a pressure sealable door positioned on said outer surface, such that said firing mechanism is capable of propelling said store there through and said door is capable of forming a pressure seal.

25. The method as claimed in claim 24, wherein said door is a revolving door.

26. The method as claimed in claim 24, wherein said door is a rotary door.

27. The method as claimed in claim 26, wherein said firing mechanism is in contact with said door.

28. The method as claimed in claim 23, wherein said firing mechanism is a pneumatic actuator.

29. The method as claimed in claim 23, wherein said store is propelled about parallel to an air stream.

* * * * *